April 21, 1970   M. MAGNEN   3,507,667
CONTAINER FOR THE PRESERVATION OF FRUIT AND VEGETABLES
Filed Jan. 29, 1968   2 Sheets-Sheet 2

Inventor
Michel Magnen
By
Cushman, Darby & Cushman
Attorneys

3,507,667
CONTAINER FOR THE PRESERVATION OF FRUIT AND VEGETABLES

Michel Magnen, Paris, France, assignor to Rhone-Poulenc S.A., Paris, France, a French body corporate
Filed Jan. 29, 1968, Ser. No. 701,316
Claims priority, application France, Dec. 29, 1967, 134,435
Int. Cl. A23b 7/00; B65d 89/00
U.S. Cl. 99—171                     5 Claims

ABSTRACT OF THE DISCLOSURE

The specification describes a fruit and vegetable preservation container formed as a bag of flexible material. At least one window is formed in the flexible material, the total window area being between 0.1 and 0.25 square metre per cubic metre of useful container volume. The windows are closed by a 50 to 150 m. thick silicone elastomer diaphragm and a fabric leaving 25 to 50% free surface. The bag may be positioned in a box having apertures opposite the windows. Alternatively the window may be in a flexible cover to a rigid receptacle.

---

The present invention relates to containers for preserving fruit and vegetables.

French Patent No. 1,397,270 shows that fruit can be preserved by storing it in specially designed chambers which communicate with the external air only through a diaphragm having selective permeability to gases and vapours. This diaphragm is most suitably made of silicone elastomer.

Such installations for the preservation of fruit necessitate the special design of buildings and do not lend themselves to the simultaneous preservation of fruits of different varieties or to the staggering of ripening. Moreover, they obviously do not permit both the transport and the preservation of fruit.

According to the present invention there is provided a container for the preservation of fruit and vegetables, comprising a plurality of gas-tight walls, at least one wall of which is formed of a gas-tight flexible material having at least one window therein closed by a diaphragm formed of a silicone elastomer of a thickness between 50 and 150$\mu$ and of a fabric leaving 25% to 50% of free surface, the total window area being 0.1 to 0.25 square metre per cubic metre of useful volume of the container.

With such a container limited quantities of fruit, even of different species, or of different stages of ripeness, may be stored in a building which has not been specially designed, if desired fruit may be transported in such containers.

In order that the invention may more readily be understood, the following description is given, merely by way of example, reference being made to the accompanying drawings, in which.

Figure 1:
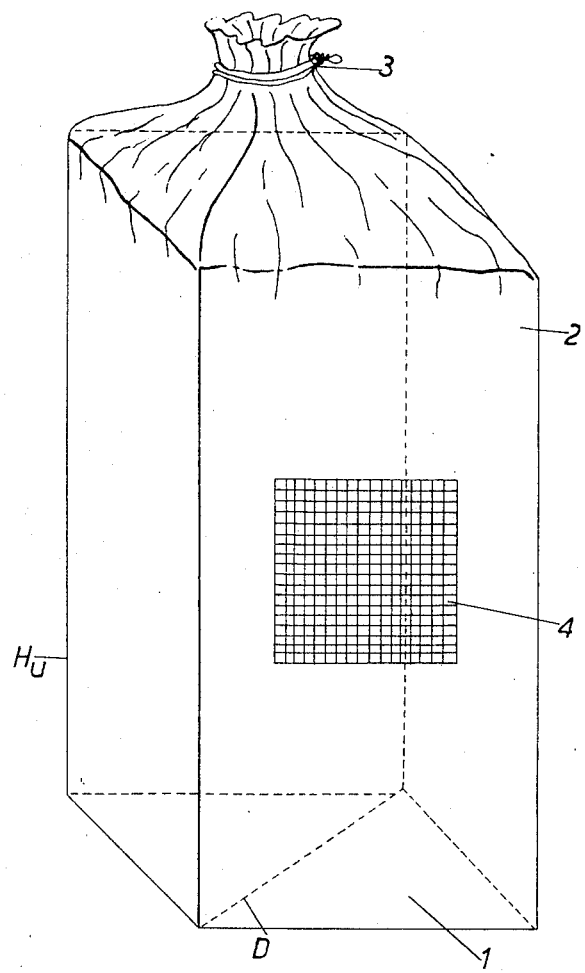
FIGURE 1 is a schematic perspective view of one embodiment of container according to the invention.

The bag diagrammatically illustrated in FIGURE 1 comprises a rectangular or square base 1 and side faces 2. Thus, when completely developed it has the form of a parallelepiped of rectangular or square cross-section which is open at the end further from the base. This end may be closed at the end furthermost convenient by tying the open end by means of a binding 3. One or more of the side faces is formed with one or more windows 4 closed by a semi-permeable diaphragm based on silicone elastomer. The window or windows have a total useful surface of between 0.10 and 0.25 square metre and preferably between 0.15 and 0.19 square metre per cubic metre of useful volume of the bag. By "useful surface of the window" is meant that surface of the window which is closed only by the diaphragm, that is to say, excluding the overlapping surface by which the diaphragm is mounted on the walls of the bag.

By "useful volume of the bag" is meant the volume which can be utilised in practice when the edges of the bag are substantially rectilinear and the bag is closed. In practice, the useful volume is determined by multiplying the surface area S of the base by the useful height H$u$, the useful height H$u$ being in turn determined by taking the whole of the height of the bag H and subtracting therefrom the length of the diagonal D of the base. The useful volume of the bag is therefore defined by the following practical formula $$v_\text{u} = S(H-D)$$

Of course, the window may have any desired form, a circular or rectangular form being most suitable; in practice, it is preferred to employ a square or rectangular window. The centre of this window is conveniently situated approximately on the central axis of a side face and approximately at the centre of the useful height.

The bag is made of any material which may be formed into flexible sheets whose permeability to gases and to water vapour is substantially negligible under the conditions of use. Thus, the bag may be made of coated fabrics of the usual type, for example fabrics coated with polyvinyl chloride, rubber or neoprene, or it may consist of a metal sheet, for example of aluminium, or preferably of a flexible single-material or laminated plastic film. Any plastic film on the market may be used, either in single-material or laminated form. By way of example, films based upon viscose, polyamide, ethylene polyterephthalate, polyvinyl chloride, polypropylene or polyethylene may be mentioned.

In practice, the polyethylene film, of high-density or low-density type, or of a mixture of these two types is preferred.

The flexible sheets employed to make the bag are normally of a thickness between 100 and 500$\mu$ and preferably between 100 and 200$\mu$. These thicknesses are not critical.

One of the main difficulties in construction resides in correctly forming and positioning the window. The window comprises a diaphragm consisting of a film of silicone elastomer in which a fabric is embedded. The silicone elastomer is preferably based upon dimethyl polysiloxane. The fabric is preferably a gauze-type fabric having square meshes, of 20 to 50 filaments per centrimetre, the component filaments of which are preferably highly twisted. Ethylene polyterephthalate filaments are particularly suitable. The surface left free between the component filaments of the fabric must be between 25% and 50% in order that the diaphragm may give a sufficient total exchange.

The silicone elastomer film constituting the active exchanger part with which the fabric is coated has a minimum thickness between 50 and 150$\mu$, and preferably between 60 and 100$\mu$ in the interval left free by the meshes of the fabric. In order to form the window, the fabric may be coated by the usual methods, by application of successive layers of a solution of silicone elastomer in an appropriate solvent, drying and hot vulcanisation by the usual methods.

As a variant, the window may consist of a silicone elastomer diaphragm of 50 to 150$\mu$ engaged between two fabrics which ensure the mechanical strength of the assembly. By "silicone elastomer" is meant any organic silicone compound which is capable of giving an elastomer after polymerisation and vulcanisation, such as the silicone elastomers mentioned in French Patent No. 1,397,270.

In the formation of the window, a hole of the desired dimensions is cut, in the desired location, in the bag previously produced from the flexible sheet, the edges of the said hole preferably being parallel to the sides of the relevant face of the bag. The active exchanger portion is cut to the corresponding dimensions and bonded by any appropriate means to form a fluid-tight junction with the flexible sheet.

For example, when the bag consists of a polyethylene film, a fabric is adhesively secured at elevated temperature around the cut-out hole so as to form a frame around the latter, and the diaphragm is adhesively secured to the fabric by means of a cold vulcanisable silicone elastomer. Appropriate techniques of this kind may be employed in accordance with the nature of the material of which the bag consists.

In use, the bag is opened and its side faces are folded downwards, whereafter it is charged with fruit, carried, for example, in open crates (which are themselves advantageously handled on pallets), and is finally closed.

It is particularly desirable to produce a bag whose dimensions are slightly greater than those of a standard handling pallet (1.20 m. x 1 m.). The bag may also be disposed upon a pallet and loaded with cases of fruit supplied on a pallet. It is thus possible either to load the bag or to manipulate a loaded bag, with the usual devices for handling on pallets.

Preservation in a controlled atmosphere is essentially applied to apples and pears. It is advantageous to preserve many cultivated varieties.

Apples: Golden, Red Delicious, Richared, Jonathan, Boskoop, Calville Blanc, Canada, etc.

Pears: Williams, Comice, Passe Crassane, Conference, etc.

The following procedure is recommended:

The fruit intended to be stored in a controlled atmosphere must be protected from late speckling, moniliasis, preservation diseases and attack by insects.

Treatments with polyvalent fungicides and insecticides, acaricide, etc., are recommended in the course of the two to three months preceding the picking.

For the last two or three applications at intervals of fifteen days before the harvesting, it is advisable to use a fresh liquid fungicide having persistent efficacity, which does not stain.

On the other hand, it is very important to pick the fruit at a very early stage of ripening. By way of example, Golden apples will be picked when the colour of their skin is pale green.

It is recommended that too long a period should not be allowed to elapse between the picking and the storage, in order to avoid losses. Finally, in order to avoid condensation, the bags should not be closed until the fruit is at the preservation temperature.

BAGGING (1) Form the square base by unfolding the bottom of the bag;
(2) Place the bag on a pallet or on the ground, depending upon whether it is desired to stack it;
(3) Roll the sides of the bag on themselves;
(4) Place the crates inside the bag;
(5) Commence to raise the sides of the bag;
(6) When the bag has been sufficiently loaded to obtain a good preservation, with due regard to the practical formula referred to earlier, raise the sides of the bag;
(7) Close the top of the bag by grasping the polyethylene and tying it with one or two cords;
(8) Check that the bag has no perforations.

In the course of these operations, it is necessary to take certain precautions in order to avoid tearing the polyethylene. For example, the base and the top of each bag may be protected by means of sheets of pasteboard or various plastics, such as polyethylene, polyurethane foam, etc. Any perforations may be sealed by means of adhesive tapes.

OPENING THE BAG

It is necessary to leave the fruit in the air for 3 to 4 days before marketing in order to restore its flavour. It appears, although it has not been scientifically confirmed, that one should not too suddenly reactivate the fruit, the life of which has been greatly slowed down. For this purpose, it is desirable to open the top of the bag and to lower the sides only after a few days.

If the described operations are carried out, the fruit is excellently preserved and arrives in an ideal state for marketing: firmness, turgescence, flavour. When used under normal conditions, the bags can last in practice 4 to 5 years.

One of the advantages of the bags is that each bag may be allocated to a particular type of fruit, and that these various bags may be stored in the same premises and used separately according to requirements.

As described, the bags are particularly adapted for the preservation of apples and pears.

The internal atmosphere of the bag is balanced at a predetermined value depending upon the storage temperature and the nature of the fruit. For example, if a bag is appropriately loaded with apples and kept at a temperature between 0° and 10° C., the composition of the atmosphere of the bag is substantially balanced at 92% nitrogen, 3% oxygen and 5% $CO_2$ with saturation of the atmosphere with water vapour, which makes a long preservation of the apples possible.

The bags may be employed as a component part of containers, notably for the despatch of fruit simultaneously with their preservation. Thus the containers may comprise a bag as described above and a substantially rigid external casing of the same dimensions and shape as the bag. The rigid casing may be of any known type consisting of wood, metal, optionally reinforced pasteboard or plastics. The external casing may optionally have a continuous wall. That portion of the external casing which is situated opposite the window should be apertured so as not to prevent communication of the internal atmosphere of the bag with the external air through the window.

Figure 2:
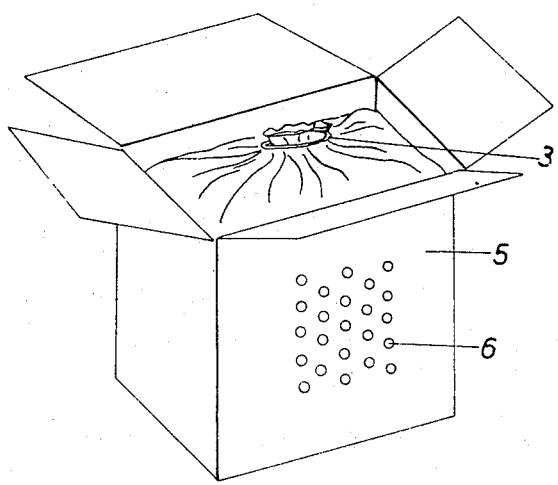
FIGURE 2 shows the container of FIGURE 1 housed in a rigid casing.

That portion of the casing which corresponds to the window should therefore be cut out, formed as an openwork, perforated or even simply provided with bars holding the window at a distance from the wall and permittigng the desired ventilation of the window. The casing may be adapted to be opened at the top or at the sides, and it may be hinged in accordance with the usual techniques. FIGURE 2 shows an example of such a container for transport and handling having a pasteboard casing 5 formed with ventilation orifices 6.

Figure 3:
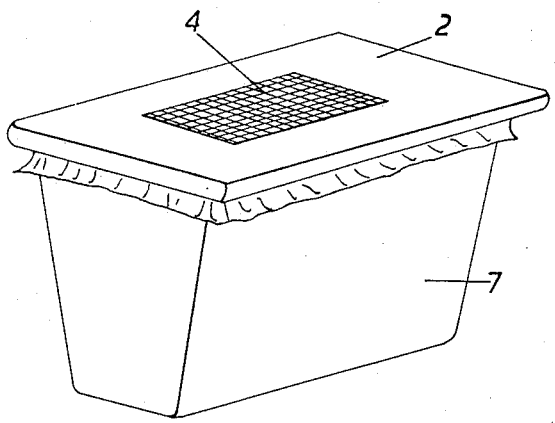
FIGURE 3 is a similar view of a further embodiment.

As illustrated in FIGURE 3, the container of the present invention, may consist of a gas-tight rigid receptacle body 7 closed by the film 2 formed with a window 4 as described. The receptacle may then have any desired shape. In this case, the volume of the rigid receptacle corresponds to the useful volume as mentioned above and the window in the film by which the closure is effected must have the indicated dimensions. The film and its window may close one side face of the receptacle or the upper face, and the film by which this receptacle is closed must be secured to the receptacle in fluid-tight manner, for example with the aid of a binding or an appropriate adhesive connection, or both. Of course, the closure film may be protected by any desired device such as an apertured lid.

The containers of the invention may be employed for products other than fruit such as vegetables.

The following examples are given without limitation to illustrate the invention.

In all these examples, the windows comprise a diaphragm consisting of organopolysiloxane elastomer on a square-mesh fabric having 40 filaments per centimetre, consisting of ethylene polyterephthalate, 90 deniers, 3000 turns; minimum thickness of the diaphragm: 80µ.

EXAMPLE 1

Bag for 500 kg. of apples

This bag permits the preservation of: 500 kg. of fruit at +10° C., or 600 kg. of fruit at +5° C., or 700 kg. of fruit at +2°/+3° C.

The characteristics are as follows: square base, 1.30 x 1.30 metres; height, 3 metres; walls of high-pressure polyethylene film; hemless free opening at the upper end; thickness of the polyethylene, 120 microns (µ); surface of the exchange window, 0.35 square metre; window situated laterally at mid-height; thickness of the window, 80µ.

EXAMPLE 2

This bag permits the preservation of: 1000 kg. of fruit at +10° C.; 1200 kg. of fruit at +5° C.; 1400 kg. of fruit at +2°/+3° C.

The characteristics are the following: square base, 1.30 x 1.30 metres; height, 4.50 metres; walls consisting of high-pressure polyethylene film; hemless free opening at the upper end; thickness of the polyethylene, 120µ; surface of the exchange window, 0.70 m.²; window disposed laterally at mid-height; thickness of the window, 80µ.

EXAMPLE 3

Shipping container

This container conforms with FIGURE 2.

It comprises a bag consisting of 100µ polyethylene, of a height of 95 cm., having a square base with sides of 30 cm. One of the sides is formed with a window measuring 10 cm. by 10 cm., the sides of which are parallel to the edges of the bag and are centred at 25 cm. from the bottom. The external casing consists of pasteboard of a thickness of 4 mm., having a square base with sides of 30 cm., and a height of 50 cm. One of the sides of the box is formed with 32 round holes of 1 square cm. each, quincuncially distributed in a square having sides of 12 cm., which is centred on the side of the box.

Such a container is suitable for despatching from 10 to 15 kg. of exotic fruit, such as liches.

EXAMPLE 4

Rigid receptacle

This container conforms with FIGURE 3.

It comprises a box consisting of high-density polyethylene of a thickness of 5 mm., having a base measuring 50 x 60 cm. and a height of 40 cm., the upper edge comprising a rounded projecting rib. It is loaded with fruit separated from the base by an openwork spacer. It is closed by an ethylene polyterephthalate film of 150µ comprising a window of 200 square cms., attached by a binding around the opening of the box.

Such a receptacle permits handling and preservation of 25 kg. of apples.

I claim:
1. A process for the storage of fruit or vegetables, comprising the steps of:
  (a) forming a container comprising in combination:
    (aa) a plurality of gas tight walls effective to define a useful volume to said container;
    (bb) at least one of said walls being formed of a gas tight flexible material including a window therein, whereby the total window area is equal to 0.1 to 0.25 square metre per cubic metre of said useful volume of said container; and
    (cc) means closing said total window area comprising a silicone elastomer diaphragm having a thickness between 50 and 150µ and a fabric leaving 25% to 50% of free surface;
  (b) inserting said food or veegtables in said container; and
  (c) closing said container.
2. A process as claimed in claim 1, wherein said gas tight walls of said bag are made of the same flexible material, one of said walls defining a substantially flat base for said bag.
3. A fruit and vegetable preservation container, said container comprising in combination:
  (a) a plurality of gas tight walls effective to define a useful volume to said container;
  (b) at least one of said walls being formed of a gas tight flexible material including a window therein, whereby the total window area is equal to 0.1 to 0.25 square metre per cubic metre of said useful volume of said container; and
  (c) means closing said total window area comprising a silicone elastomer diaphragm having a thickness between 50 and 150µ and a fabric leaving 25% to 50% of free surface.
4. The container specified in claim 3, wherein all of said gas tight walls are formed of the same flexible material.
5. The container specified in claim 4, wherein said walls define a substantially flat base for said bag.

References Cited

UNITED STATES PATENTS

| | | | |
|---|---|---|---|
| 2,990,948 | 7/1961 | Zackheim | 206—46 |
| 3,229,813 | 1/1966 | Crowe et al. | 206—63.2 |
| 2,011,179 | 8/1935 | Krout | 229—53 |
| 2,428,266 | 9/1947 | Daniels | 229—55 |
| 3,154,215 | 10/1964 | Le Vesconte | 206—46 |

FOREIGN PATENTS

| | | |
|---|---|---|
| 1,372,270 | 3/1965 | France. |
| 2,171 | 8/1966 | Netherlands. |
| 1,073,848 | 1/1960 | Germany. |

WILLIAM T. DIXON, JR., Primary Examiner

U.S. Cl. X.R.

99—193; 206—46; 229—53